(12) United States Patent
Fukuda (10) Patent No.: US 7,962,228 B2
(45) Date of Patent: Jun. 14, 2011

(54) EVALUATION DEVICE FOR CONTROL SYSTEM, VALIDATION DEVICE USED IN EVALUATION DEVICE, METHOD FOR EVALUATING CONTROL SYSTEM, AND COMPUTER PROGRAM USED THEREIN

(75) Inventor: Koichiro Fukuda, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1272 days.

(21) Appl. No.: 11/578,944

(22) PCT Filed: Dec. 21, 2005

(86) PCT No.: PCT/JP2005/024016
§ 371 (c)(1),
(2), (4) Date: Oct. 19, 2006

(87) PCT Pub. No.: WO2006/073103
PCT Pub. Date: Jul. 13, 2006

(65) Prior Publication Data
US 2007/0255482 A1 Nov. 1, 2007

(30) Foreign Application Priority Data
Jan. 7, 2005 (JP) ................................. 2005-002123

(51) Int. Cl.
*G01M 17/00* (2006.01)
*G06F 19/00* (2011.01)
*G05B 13/00* (2006.01)

(52) U.S. Cl. ............... 700/29; 701/29; 701/99; 701/102

(58) Field of Classification Search ............... 700/28–31, 700/274; 60/274, 276; 701/29, 99, 101, 701/102; 123/672
See application file for complete search history.

(56) References Cited

U.S. PATENT DOCUMENTS

| | | | |
|---|---|---|---|
| 5,535,128 A | | 7/1996 | Laube et al. |
| 5,539,638 A | * | 7/1996 | Keeler et al. ..................... 701/29 |
| 5,682,317 A | * | 10/1997 | Keeler et al. ..................... 701/29 |
| 5,747,682 A | | 5/1998 | Hirano |
| 5,877,954 A | * | 3/1999 | Klimasauskas et al. ......... 700/29 |
| 6,666,198 B2 | * | 12/2003 | Mitsutani ...................... 123/674 |
| 6,826,521 B1 | * | 11/2004 | Hess et al. ...................... 700/29 |
| 6,862,514 B2 | * | 3/2005 | Ehara ............................. 701/102 |
| 6,950,741 B2 | * | 9/2005 | Ishikawa et al. .............. 701/110 |
| 2002/0032490 A1 | | 3/2002 | Lin |
| 2003/0120360 A1 | * | 6/2003 | Yasui et al. ..................... 700/29 |
| 2003/0130785 A1 | * | 7/2003 | Ishikawa et al. .............. 701/110 |
| 2004/0084015 A1 | | 5/2004 | Sun et al. |

FOREIGN PATENT DOCUMENTS

EP 0 660 208 A 6/1995

(Continued)

*Primary Examiner* — Charles R Kasenge
(74) *Attorney, Agent, or Firm* — Oliff & Berridge, PLC (57) ABSTRACT

An evaluation device (22) comprises an evaluation target model (31) which operates according to a control algorithm to be implemented in the control system, and which outputs a manipulated variable of a predetermined controlled equipment (8) included in the physical device (1) in correspondence with a predetermined input condition, a state quantity presumption model (32) which presumes a state quantity of the physical device subjected to an influence of an operation of the controlled equipment in correspondence with a predetermined state quantity presumption condition, and which outputs the presumed state quantity, and a model control device (33) which provides the input condition to the evaluation target model so that the manipulated variable is output therefrom.

13 Claims, 9 Drawing Sheets

FOREIGN PATENT DOCUMENTS

| | | |
|---|---|---|
| JP | A 4-159439 | 6/1992 |
| JP | A 7-28505 | 1/1995 |
| JP | A-8-16215 | 1/1996 |
| JP | A-9-142280 | 6/1997 |
| JP | A-11-353007 | 12/1999 |
| JP | A 2003-108697 | 4/2003 |

* cited by examiner

INPUT CONDITION

| NAME OF ITME | UNIT | INPUT VALUE |
|---|---|---|
| ENGINE SPEED | rpm | 1500 |
| SPEED OF VEHICLE | km | 20 |
| ACCELERATOR OPENING DEGREE | % | 5 |
| INTAKE AIR AMOUNT | g/s | 12 |
| A/F | | 15 |
| COMMON RAIL PRESSURE | MPa | 40 |
| INTAKE MANIFOLD PRESSURE | MPa | 97 |
| WATER TEMPERATURE | °C | 80 |
| FUEL TEMPERATURE | °C | 30 |
| ATMOSPHERE TEMPERATURE | °C | 25 |
| CATALYST INLET GAS TEMPERATURE | °C | 180 |
| CATALYST OUTLET GAS TEMPERATURE | °C | 180 |

FIG.4

| FACTOR | UNIT | METHOD FOR PROVIDING ERROR | ERROR |
|---|---|---|---|
| AMOUNT OF CYLINDER INJECTION | $mm^3$/ST | OFFSET(±) | 0 |
| AMOUNT OF AIR DETECTED BY AFM | g/s | GAIN(×) | 1.1 |
| AMOUNT OF FUEL ADDED TO EXHAUST GAS | $mm^3$ | ↑ | 1 |
| CATALYST HEAT CAPACITY | J/°C | ↑ | 1 |
| FUEL DEPOSIT RATE | % | ↑ | 1 |
| FUEL EVAPORATIVE RATE | % | ↑ | 1 |
| CATALYST PURIFICATION RATE | % | ↑ | 1 |
| HC LOWER CALORIFIC VALUE | J/g | ↑ | 1 |

| DEGREE OF RISK | LOWER LIMIT OF BED TEMPERATURE (°C) | UPPER LIMIT OF BED TEMPERATURE (°C) |
|---|---|---|
| 5 | 900 | |
| 4 | 800 | 900 |
| 3 | 750 | 800 |
| 2 | 700 | 750 |
| 1 | | 700 |

FIG.9

| FREQUENCY | LOWER LIMIT OF NUMBER OF TIMES | UPPER LIMIT OF NUMBER OF TIMES |
|---|---|---|
| 5 | 10 | |
| 4 | 7 | 9 |
| 3 | 4 | 6 |
| 2 | 2 | 3 |
| 1 | | 1 |

FIG.10

| DEGREE OF DETECTION | LOWER LIMIT OF ERROR (°C) | UPPER LIMIT OF ERROR (°C) |
|---|---|---|
| 5 | -50 | |
| 4 | -30 | -50 |
| 3 | 0 | -30 |
| 2 | 30 | 0 |
| 1 | | 30 |

FIG.11

| FACTOR | UNIT | CENTRAL CONDITION | CONDITION 1 | CONDITION 2 | CONDITION 3 | CONDITION 4 | CONDITION 5 |
|---|---|---|---|---|---|---|---|
| AMOUNT OF CYLINDER INJECTION | mm³/ST | 0 | 1 | -1 | 0 | 1 | 0 |
| AMOUNT OF AIR DETECTED BY AFM | g/s | 1 | 1 | 1 | 1.05 | 1.06 | 1 |
| AMOUNT OF FUEL ADDED TO EXHAUST GAS | mm³ | 1 | 1 | 1 | 1 | 1 | 1 |
| CATALYST HEAT CAPACITY | J/°C | 1 | 1 | 1 | 1 | 1 | 0.9 |
| FUEL DEPOSIT RATE | % | 1 | 1 | 1 | 1 | 1 | 1 |
| FUEL EVAPORATIVE RATE | % | 1 | 1 | 1 | 1 | 1 | 1 |
| CATALYST PURIFICATION RATE | % | 1 | 1 | 1 | 1 | 1 | 1.2 |
| HC LOWER CALORIFIC VALUE | J/g | 1 | 1 | 1 | 1 | 1 | 1 |
| MAXIMUM VALUE OF BED TEMPERATURE | °C | 680 | 670 | 760 | 690 | 670 | 705 |
| DEGREE OF RISK |  | 1 | 1 | 3 | 1 | 1 | 2 |
| OT NUMBER OF TIMES | 回 | 0 | 0 | 4 | 0 | 0 | 2 |
| FREQUENCY |  | 1 | 1 | 3 | 1 | 1 | 2 |
| PRESUMED ERROR | °C | 0 | 0 | -48 | 0 | 0 | -27 |
| DEGREE OF DETECTION |  | 1 | 1 | 4 | 1 | 1 | 3 |
| RPN |  | 1 | 1 | 36 | 1 | 1 | 12 |

US 7,962,228 B2

EVALUATION DEVICE FOR CONTROL SYSTEM, VALIDATION DEVICE USED IN EVALUATION DEVICE, METHOD FOR EVALUATING CONTROL SYSTEM, AND COMPUTER PROGRAM USED THEREIN

TECHNICAL FIELD

The present invention relates to a device and a method for evaluating a control system of a physical device such as an engine, and a computer program used therein.

BACKGROUND ART

In order to evaluate performance of a control system of an automobile engine, there is proposed a device which is configured to combine a control model having a control algorithm to be implemented in the control system and an engine model modeling an actual engine in a predetermined method, import a physical quantity (e.g., amount of intake air) having an effect on an operating condition set in the engine model to the control model from the engine model while imaginarily making the engine model operate in a predetermined input condition, calculate a manipulated variable of a controlled equipment, such as a fuel injection valve based on the imported physical quantity, provide the manipulated variable to the engine model to confirm control efficiency of the control algorithm (e.g., see Japanese Patent Application Laid-Open (JP-A) No. 4-159439). Additionally, there exists JP-A Nos. 2003-108697 and 7-28505 as prior art documents related to the present invention.

The above conventional device simply changes input conditions of the engine model and confirm its control efficiency. However, in the case of actual vehicles, manufacturing tolerances exist in controlled equipments. Accordingly, the actual manipulated variable differs from the instructed value of manipulated variable and, with those differences, the operating state of the engine may be changed. Further, regarding various physical quantities such as amount of intake air or purification rate of an exhaust purification catalyst which are considered by the engine model, variation occurs in the actual engine in accordance with manufacturing tolerance, or differences in various parameters such as atmosphere temperature, fuel physical characteristics of engine components or the like, which detect or determines the physical quantities. According to the conventional devices, prediction of control efficiency in consideration of the above described differences in manipulated variables or variations in physical quantities cannot be provided. Therefore, in order to evaluate the control system accurately, it is required to control the actual engine with the control system to confirm the control efficiency. As a result, there have been problems such that evaluating the control system takes a lot of efforts, or that development period is protracted.

DISCLOSURE OF THE INVENTION

An object of the present invention is to provide an evaluation device, an evaluation method and the like in order to reduce efforts regarding evaluation of control system prepared for controlling a physical device of an engine or the like.

To solve the above described problem, in one aspect of the present invention, there is provided an evaluation device for a control system of a physical device, comprising: an evaluation target model which operates according to a control algorithm to be implemented in the control system, and which outputs a manipulated variable of a predetermined controlled equipment included in the physical device in correspondence with a predetermined input condition; a state quantity presumption model which presumes a state quantity of the physical device subjected to an influence of an operation of the controlled equipment in correspondence with a predetermined state quantity presumption condition, and which outputs the presumed state quantity; and a model control device which provides the input condition to the evaluation target model so that the manipulated variable is output therefrom and which provides, as the state quantity presumption condition, an error regarding at least one parameter to be referred in a presumption of the state quantity, which is not considered by the evaluation target model, in addition to the input condition provided to the evaluation target model and the manipulated variable output from the evaluation target model, to the state quantity presumption model so that a state quantity reflecting an influence of the error on a state quantity corresponding to the manipulated variable output from the evaluation target model is output from the state quantity presumption model.

According to the evaluation device of the above aspect, the evaluation target model outputs the manipulated variable of the controlled equipment in correspondence with the input condition provided thereto. To the state quantity presumption model, an error regarding a parameter used in a presumption of the state quantity is provided in addition to the input condition provided to the evaluation target model and the manipulated variable output from the evaluation target model as the state quantity presumption condition. As a result, a state quantity in which the influence of the error is added to the state quantity corresponding to the manipulated variable output from the evaluation target model is output from the state quantity presumption model. Accordingly, it is possible to predict the capability of the control system such as robustness thereof in consideration of the influence of the error, and thus effort regarding the evaluation of the control system can be reduced.

In one embodiment of the evaluation device of the present invention, the model control device may provide the error for a parameter included in the input condition or the manipulated variable output from the evaluation target model. According to this embodiment, it is possible to predict a change of the state quantity in the case where an error exists in the input condition provided to the evaluation target model or in the manipulated variable provided to the state quantity presumption model from the evaluation target model, and is possible to evaluate the robustness or the like of the control system against the error.

In one embodiment of the evaluation device of the present invention, the evaluation target model may presume a state quantity to be controlled by an operation of the controlled equipment and reflect a presumption result to control of the state quantity, and the state quantity presumption model may presume and output a state quantity which is the same kind of the state quantity presumed by the evaluation target model. According to this embodiment, while the evaluation target model presumes a state quantity without considering the influence of the error and carries out the control of the state quantity reflecting the presumed result, the state quantity presumption model presumes the state quantity reflecting the error. Accordingly, it is possible to recognize a difference between presumption values of the state quantities of both models to thereby evaluate the control system based on the relationship between the error provided to the state quantity presumption model and the difference appeared in the presumption values of the state quantities. For example, the evaluation can be performed in such ways that if the difference between the state quantity presumption values is very small or there is no difference therebetween, it is possible to determine that the control algorithm is healthy. In this embodiment, the evaluation target model may reflect a difference between the state quantity presumed by the evaluation target model and the state quantity presumed by the state quantity presumption model to a presumption of the state quantity in the evaluation target model. According to this embodiment, it is possible to evaluate whether or not the evaluation target model detects a presumption error of the state quantity and can properly reflect the detection result to the presumption of the state quantity.

In one embodiment of the present invention, the evaluation device may further comprise an analyzing device which quantifies an influence of the error on control of the state quantity of the evaluation target model based on at least one of degree or frequency for the case where the state quantity output from the state quantity presumption model exceeds an allowable region. According to this embodiment, it is possible to quantitatively and objectively recognize the degree or the frequency for the case where the state quantity exceeds the predetermined allowable region to evaluate the control system.

In one embodiment in which the evaluation target model has a presuming function of a state quantity, the evaluation device may further comprise an analyzing device which quantifies an influence of the error on control of the state quantity of the evaluation target model based on a difference of state quantities presumed in the evaluation target model and the state quantity presumption model respectively. In this embodiment, it is possible to quantitatively and objectively recognize whether or not the evaluation target model can properly reflect the detection result regarding the presumption error of the state quantity to the presumption of the state quantity to evaluate the control system. In this embodiment, the analyzing device may quantify the influence of the error on the control of the state quantity by the evaluation target model, further taking at least one of degree or frequency for a case where the state quantity output from the state quantity presumption model exceeds a predetermined allowable region into account. Consequently, it is possible to further take the degree or the frequency for the case where the state quantity exceeds the predetermined allowable region into account to evaluate the control system.

In one embodiment with the analyzing device, the evaluation device may further comprise an analyzing result displaying device which displays an analyzing result quantified by the analyzing device on a predetermined display device. According to this embodiment, it is possible to properly display the evaluation result of the control device via a display to a user. Further, the analyzing result displaying device may perform a predetermined highlighting display when the analyzing result excesses a predetermined allowable region. With such a highlighting display, the user can easily recognize a problem of the control system.

In a preferred embodiment of the evaluation device according to one aspect of the present invention, the physical device may be an automobile engine, the control algorithm may be implementable to an engine control unit as a computer to be combined with the engine, the input condition may include a parameter group for determining an operation condition or an environment condition of the engine, and the controlled equipment may be an equipment of the engine, which is operated for controlling the engine.

According to another aspect of the present invention, the present invention may be configured as a validation device for evaluating a control system of a physical device in combination with an evaluation target model which operates according to a control algorithm to be implemented in the control system, and which outputs a manipulated variable of a predetermined controlled equipment included in the physical device in correspondence with a predetermined input condition. To solve the above described problem, such validation device comprises: a state quantity presumption model which presumes a state quantity of the physical device subjected to an influence of an operation of the controlled equipment in correspondence with a predetermined state quantity presumption condition, and which outputs the presumed state quantity; and a model control device which provides the input condition to the evaluation target model so that the manipulated variable is output therefrom and which provides, as the state quantity presumption condition, an error regarding at least one parameter to be referred in a presumption of the state quantity, which is not considered by the evaluation target model, in addition to the input condition provided to the evaluation target model and the manipulated variable output from the evaluation target model, to the state quantity presumption model so that a state quantity reflecting an influence of the error on a state quantity corresponding to the manipulated variable output from the evaluation target model is output from the state quantity presumption model.

According to the validation device of the above aspect of the present invention, it is possible to configure the evaluation device according to one aspect of the present invention in combination with the evaluation target model to thereby enable a prediction where an influence of the error, which is not considered in the evaluation target model with respect to the control of the control system, is included, and effort for the system can be reduced.

In order to solve the above described problem, according to further aspect of the present invention, there is provided an evaluation method for evaluating a control system of a physical device, comprising the steps of: making an evaluation target model having a control algorithm to be implemented in the control system output a manipulated variable of a predetermined controlled equipment included in the physical device in correspondence with a predetermined input condition by providing the input condition to the evaluation target model to make the evaluation target model operate; and making a state quantity presumption model, which is configured to presume a state quantity of the physical device subjected to an influence of an operation of the controlled equipment, presume and output the state quantity of the physical device subjected to the influence of the operation of the controlled equipment in correspondence with a predetermined state quantity presumption condition by providing the state quantity presumption model with an error regarding at least one parameter to be referred in a presumption of the state quantity, which is not considered by the evaluation target model, as a state quantity presumption condition, in addition to the input condition provided to the evaluation target model and the manipulated variable output from the evaluation target model to make the state quantity presumption model operate.

According to the evaluating method according to the above described aspect of the present invention, it is possible to make the evaluation target model output the state quantity of the controlled equipment in correspondence with the input condition, while making the state quantity presumption model output the state quantity in which the influence of the error is added to the state quantity corresponding to the manipulated variable output from the evaluation target model. Consequently, the capability such as robustness of the control system can be presumed in consideration of the influence of the error and the effort regarding evaluation of control system can be reduced.

In order to solve the above described problem, according to still further aspect of the present invention, there is provided a computer program configured to make a computer serve as: an evaluation target model which operates according to a control algorithm to be implemented in the control system, and which outputs a manipulated variable of a predetermined controlled equipment included in the physical device in correspondence with a predetermined input condition; a state quantity presumption model which presumes a state quantity of the physical device subjected to an influence of an operation of the controlled equipment in correspondence with a predetermined state quantity presumption condition, and which outputs the presumed state quantity; and a model control device which provides the input condition to the evaluation target model so that the manipulated variable is output therefrom and which provides, as the state quantity presumption condition, an error regarding at least one parameter to be referred in a presumption of the state quantity, which is not considered by the evaluation target model, in addition to the input condition provided to the evaluation target model and the manipulated variable output from the evaluation target model, to the state quantity presumption model so that a state quantity reflecting an influence of the error on a state quantity corresponding to the manipulated variable output from the evaluation target model is output from the state quantity presumption model.

In order to solve the above described problem, according to still further aspect of the present invention, there is provided another computer program computer program for making a computer serve as an element of an evaluation device having an evaluation target model which operates according to a control algorithm to be implemented in a control system of a physical device, and which outputs a manipulated variable of a predetermined controlled equipment included in the physical device in correspondence with a predetermined input condition, the computer program being configured to make the computer serve as: a state quantity presumption model which presumes a state quantity of the physical device subjected to an influence of an operation of the controlled equipment in correspondence with a predetermined state quantity presumption condition, and which outputs the presumed state quantity; and a model control device which provides the input condition to the evaluation target model so that the manipulated variable is output therefrom and which provides, as the state quantity presumption condition, an error regarding at least one parameter to be referred in a presumption of the state quantity, which is not considered by the evaluation target model, in addition to the input condition provided to the evaluation target model and the manipulated variable output from the evaluation target model, to the state quantity presumption model so that a state quantity reflecting an influence of the error on a state quantity corresponding to the manipulated variable output from the evaluation target model is output from the state quantity presumption model.

By executing the above respective programs on computers, it is possible to make the computers serve as the evaluation device or the validation device according to one aspect of the present invention, or to carry out the evaluating method according to the present invention with the computers.

As described above, according to the present invention, since the state quantity reflecting the influence of the error which is not considered in the evaluation target model can be output from the state quantity presumption model, the presumption of the control effect of the control system including the influence of the error can be achieved. As a result, effort regarding the evaluation of the control system can be reduced so that development period of the control system can be shortened and costs for development can be reduced.

BEST MODE FOR CARRYING OUT THE INVENTION

Figure 1:
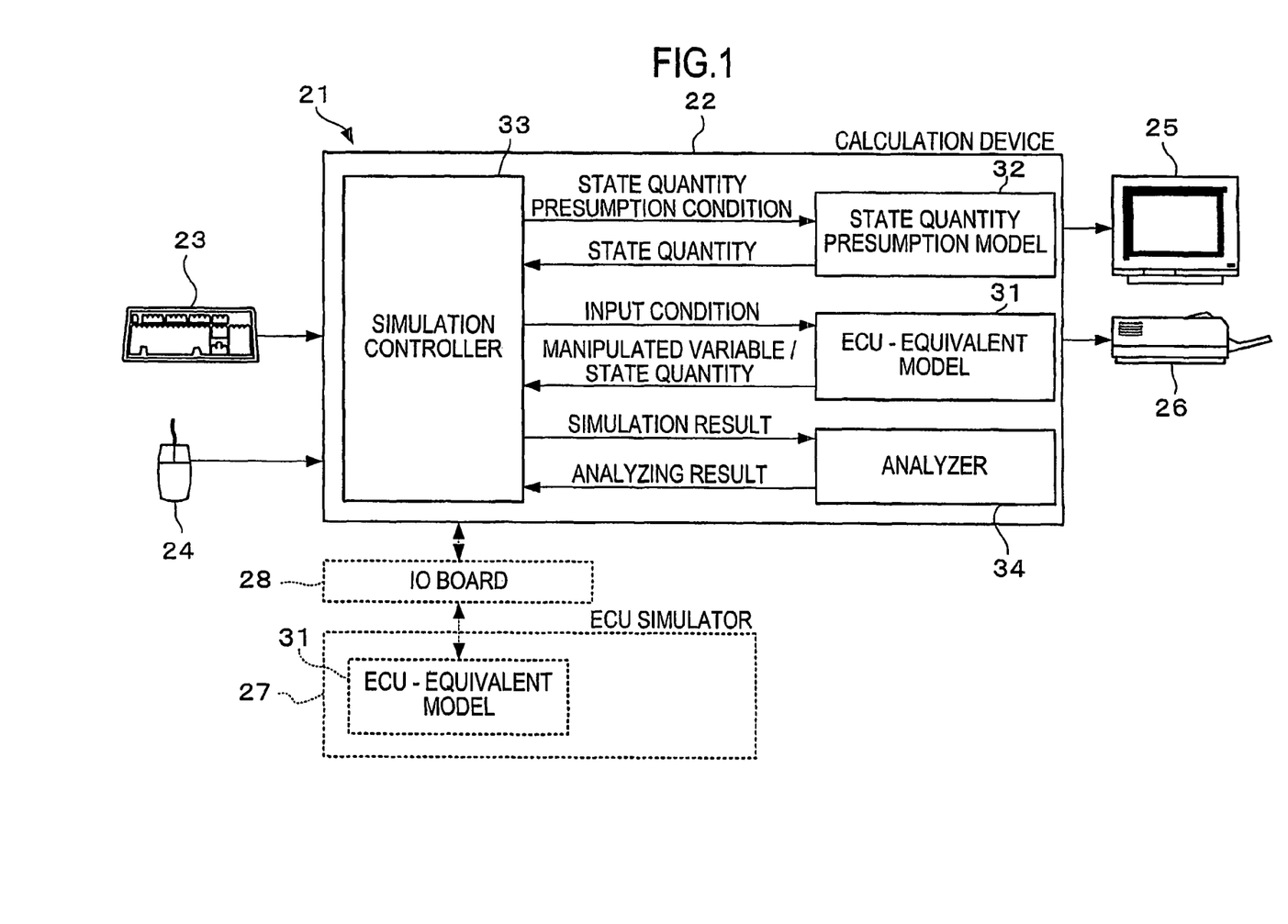
FIG. 1 is a diagram showing a hardware structure of an evaluation device according to one embodiment of the present invention.
Figure 2:
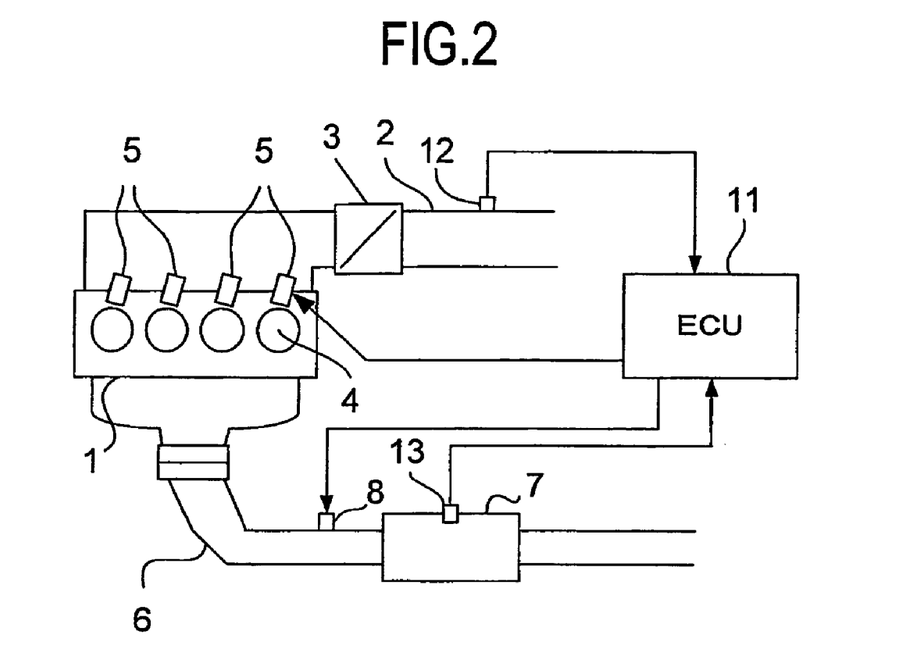
FIG. 2 is a diagram showing an outline of an automobile engine controlled by a control system to be evaluated by the evaluation device shown in FIG. 1.

FIG. 1 is a diagram showing a hardware structure of an evaluation device according to one embodiment of the present invention and FIG. 2 is a diagram showing an example of an automobile engine as a physical device having a control system to be evaluated by the evaluation device. Firstly, the control system to be evaluated will be described with reference to FIG. 2. An engine 1 shown in FIG. 2 is provided as a cylinder injection type internal combustion engine in which air is introduced from an intake passage 2 to cylinders 4 via an intake throttle valve 3, fuel is injected to the cylinders 4 from fuel injection valves 5 to generate air-fuel mixture, and the air-fuel mixture is compressed and ignited. Air discharged from the cylinders 4 is lead into an exhaust passage 6, purified by an exhaust purification catalyst 7 and then discharged to atmosphere. In the exhaust passage 6, a fuel addition valve 8 is provided to add fuel into the exhaust gas in upper stream than the exhaust purification catalyst 7 in order to regenerate the exhaust purification catalyst 7.

To the engine 1, an engine control unit (ECU) 11 as a computer unit for controlling its operational status is provided. The ECU 11 imports, as input information, various physical quantities such as the intake air amount detected by an air flow meter 12, the catalyst temperature detected by a catalyst temperature sensor 13 and the like, and operates various engine equipments (controlled equipments) such as the fuel injection valve 5, the fuel addition valve 8 and the like according to a predetermined engine control program so that the engine 1 is controlled to be in a target operation status. In this example, a combination of the ECU 11 for executing engine control program, input equipments such as the air flow meter 12 and the catalyst temperature sensor 13, equipments to be controlled by the ECU 11 such as the fuel injection valve 5 and the like corresponds to a control system to be evaluated. Here, in FIG. 2, the air flow meter 12 and the catalyst temperature sensor 13 are shown as input equipments for the ECU 11 and the fuel injection valve 5 and the fuel addition valve 8 are shown as controlled equipments, however, it is noted that they are shown as examples. As input equipments, a water temperature sensor, an accelerator opening degree sensor, a crank angle sensor and the like are also provided, and, as controlled equipments, a fuel pressure control valve, an ERG valve and the like are also provided. Here, they are not shown in the drawing.

As shown in FIG. 1, an evaluation device 21 includes a calculation device 22, a key board 23 and a mouse 24 as input devices for the calculation device 22, and, a monitor 25 and a printer 26 as output devices. The calculation device 22 is provided as a computer unit having a microprocessor and peripheral equipments, for example, a main memory device (RAM and ROM) and the like used for the operation of the microprocessor. As the calculation device 22, a personal computer or a work station may be employed, for example. The calculation device 22 reads out a program and data recorded in an external memory device which is not shown and carries out predetermined processing. By executing the program, there are generated logical devices of an ECU-equivalent model 31, a state quantity presumption model 32, a simulation controller 33 and an analyzer 34 in the calculation device 22. In FIG. 1, the ECU-equivalent model 31 and the state quantity presumption model 32 are respectively generated in a single calculation device 22. However, as shown with dashed lines in FIG. 1, an ECU simulator 27 may be connected with the calculation device 22 via an IO board 28 and the ECU-equivalent model 31 may be provided in the ECU simulator 27 so that the evaluation device 21 is generated in used of so called HILS (Hardware In the Loop Simulation) method. The input devices and output devices are shown as examples and they may be changed accordingly. Here, in this embodiment, the simulation controller 33 serves as a model control device or means and the analyzer 34 serves as an analyzing device or means. Further, a combination of the state quantity presumption model 32, the simulation controller 33 and the analyzer 34 serves as a validation device of the present invention.

The ECU-equivalent model 31 is a logical model having a function equivalent to the ECU 11, and corresponds to an evaluation target model to be evaluated by the evaluation device 21. The ECU-equivalent model 31 operates according to a control algorithm of an engine control program to be implemented in the ECU 11, calculates a manipulated variable of an equipment to be controlled by the ECU 11 and various state quantities related to the engine 1 corresponding to input condition provided to the ECU 11 from the simulation controller 33, and outputs the manipulated variable and the state quantities which are calculated. That is, the ECU-equivalent model 31 includes a manipulated variable determination function for determining manipulated variables of the controlled equipments and a state quantity presumption function for presuming state quantities of the engine 1 relevant to the manipulated variables.

Figure 3:
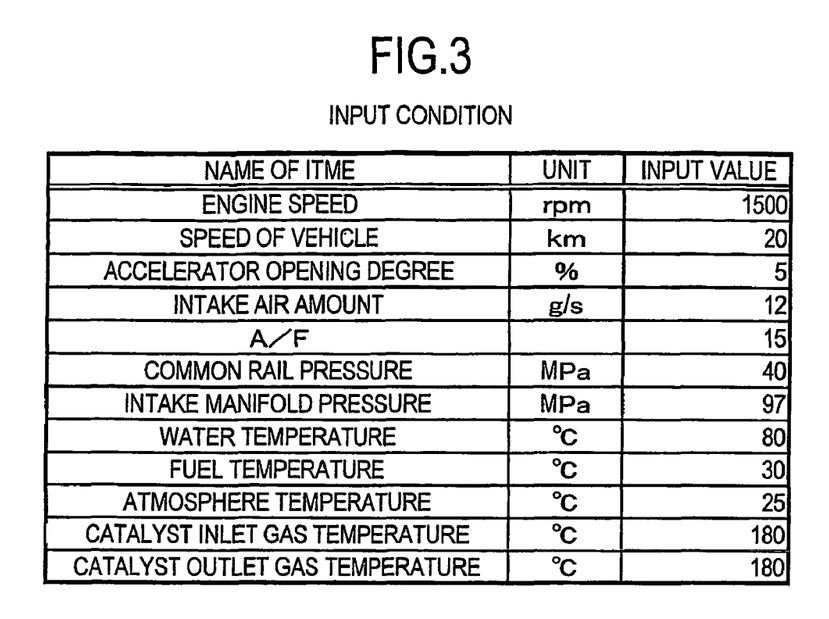
FIG. 3 is a diagram showing an example of input condition for an ECU-equivalent model.

The input condition provided to the ECU-equivalent model 31 is determined in relation to an operation condition of the engine 1 and an environmental condition of the engine 1. For example, as shown in FIG. 3, there are provided as a parameter group constituting the input condition, which includes an engine speed, speed of vehicle, acceleration opening degree, amount of intake air, air-fuel ratio (A/F), common rail pressure (fuel injection pressure), intake manifold pressure (intake pressure), water temperature, fuel temperature, atmosphere temperature, catalyst inlet gas temperature, catalyst outlet gas temperature and the like. On the other hand, as manipulated variables determined by the ECU-equivalent model 31, there exists amount of intake air, charging pressure, amount of cylinder injection, timing for injection, amount of fuel added to exhaust gas, and the like of the engine 1. These manipulated variables may be actual manipulated variables of the controlled equipments or physical quantities corresponding to the operation of the controlled equipments. For example, in case of amount of cylinder injection, the manipulated variable may be determined as the time for opening the fuel injection valve 5 for determining fuel amount injected to the cylinder 4 of the engine 1 or on-duty ratio of the fuel injection valve 5 or the like equivalent thereto. Further, the manipulated variable may be determined as fuel amount injected to the cylinder 4. The ECU-equivalent model 31 presumes, as state quantities, various physical quantities indicating the operation state of the engine 1, such as exhaust gas temperature, catalyst bed temperature.

The state quantity presumption model 32 is a virtual engine model provided in order to presume influences of operations of equipments controlled by the ECU 11. The state quantity presumption model 32 presumes the state quantity of the engine 1 corresponding to the manipulated variable output from the ECU-equivalent model 31 and outputs the presumption results, according to the state quantity presumption condition provided from the simulation controller 33. The presumed state quantity is the same kind of the state quantity presumed by the ECU-equivalent model 31. For example, the physical quantities of exhaust gas temperature, catalyst bed temperature or the like are also presumed in the state quantity presumption model. Here, various conventional methods may be employed for the modeling of the engine 1.

The state quantity presumption model 32 may be a model that presumes state quantities in the same degree of accuracy with the ECU-equivalent model 31 or may be a model that presumes state quantities with higher degree of accuracy than that of ECU-equivalent model 31. State quantity presumption condition includes, as parameters, the group of parameters constituting the input condition provided to the ECU-equivalent model 31 (see FIG. 3), the manipulated variable output from the ECU-equivalent model 31, and the error which is not considered when the ECU-equivalent model 31 presumes the state quantity. The error may be added to a parameter included in the input condition or may be added to the manipulated variable output from the ECU-equivalent model 31. Further, the error may be added to an internal parameter to which the state quantity presumption model refers when presuming the state quantity.

Figure 4:
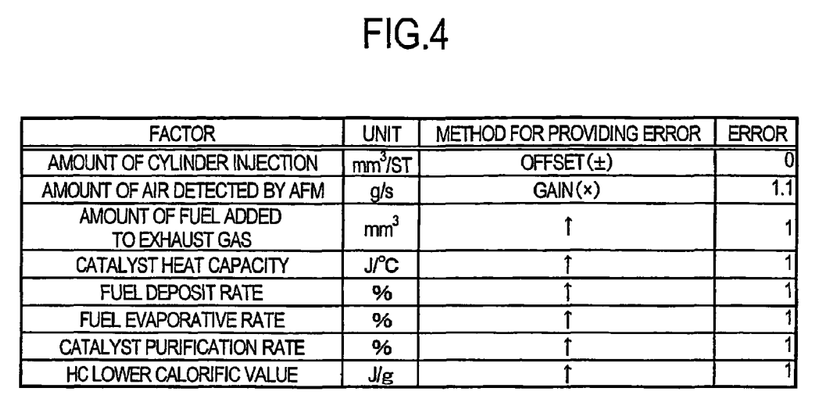
FIG. 4 is a diagram showing an example of errors given to a state quantity presumption model.

Examples of the error are shown in FIG. 4. In these examples, errors may be provided to amount of fuel cylinder injection, air flow amount detected by the air flow meter 12 (AFM detection air amount), amount of fuel added to exhaust gas, catalyst heat capacity, fuel deposit rate, fuel evaporative rate, catalyst purification rate, and HC lower calorific value, respectively. The amount of cylinder injection and the amount of fuel added to the exhaust gas are manipulated variables output from the ECU-equivalent model 31 and the AFM detection air amount is a parameter included in the input condition provided to the ECU-equivalent model 31. The catalyst heat capacity, the fuel deposit rate, the fuel evaporative rate, the catalyst purification rate, and the HC lower calorific value are internal parameters used when the state quantity presumption model 32 presumes the state quantity of the bed temperature or the like. Those internal parameters may be provided to the ECU-equivalent model 31 as internal parameters, or may not be provided to the ECU-equivalent model 31 as internal parameters. That is, the state quantity presumption model 32 may presume the state quantity with reference to more internal parameters than the ECU-equivalent model 31 and the errors given to the state quantity presumption model 32 may be added to the internal parameters to which only the state quantity presumption model 32 refers.

The simulation controller 33 works total control of the simulation such as generation of input signals to the models 31 and 32, operation control of the models 31 and 32, import of outputs (manipulated variables or state quantities) from the models 31 and 32, control of analyzing operation of the analyzer 34, and provision of an interface to a user. As an example, the simulation controller 33 sets the input condition and the state quantity presumption condition according to the user's operation to the input device and provides each condition to the ECU-equivalent model 31 and the state quantity presumption model 32 to make them operate. Further, the simulation controller 33 receives state quantities output from the models 31 and 32, transfers them to the analyzer 34, receives an analyzing result from the analyzer 34, and outputs it to the monitor 25 or the like. Alternatively, the simulation controller 33 makes the monitor 25 display a screen page for setting the input condition shown in FIG. 3 and the errors shown in FIG. 4 to thereby provide an environment in that the user can set the conditions. Here, setting of the input condition and the errors may automatically be carried out by the calculation device 22.

The analyzer 34 receives, from the simulation controller 33, the state quantities output from the models 31 and 32 as the simulation result, analyzes the simulation result with a predetermined analyzing method and outputs the analyzing result to the simulation controller 33. As an analyzing method, for example, an FMEA method is employed. An example of analysis using the FMEA method will be described later. Here, in FIG. 1, the analyzer 34 is shown separately from the simulation controller 33, however, the analyzer 34 may be included in the simulation controller 33. The simulation controller 33 can be achieved, for example, by combining simulation tool software such as MATLAB/Simulink (registered trademark) to a computer unit as hardware.

Figure 5:
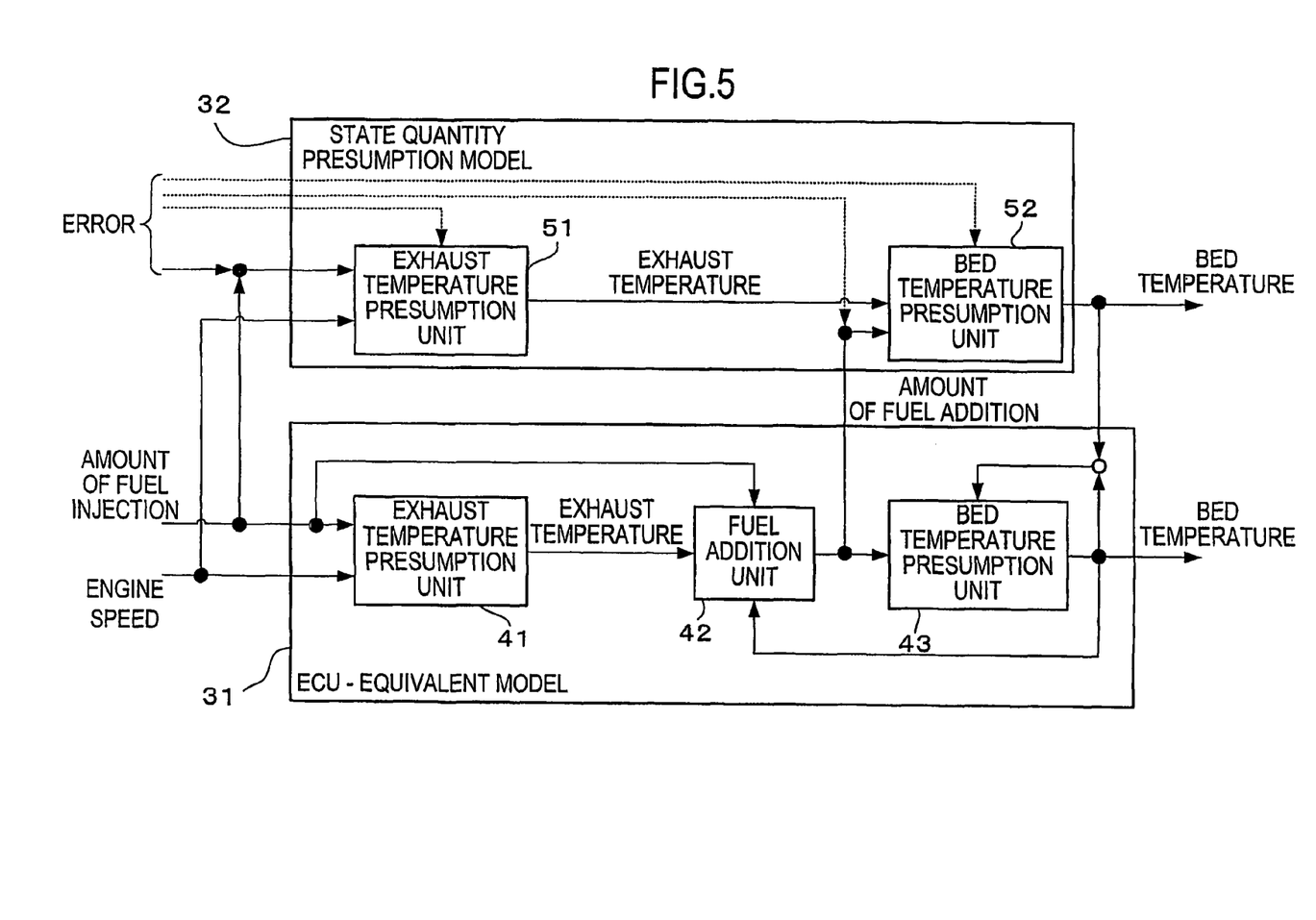
FIG. 5 is a block diagram showing an input and an output to and from each model and an internal process in each model, when bed temperature control function for a catalyst is evaluated by the evaluation device shown in FIG. 1.

Further, processing of the evaluation device 21 in case of evaluating a bed temperature control function of the ECU 11 will be described with reference to the FIGS. 5 to 11. FIG. 5 is a block diagram showing inputs and outputs to and from the ECU-equivalent model 31 and the state quantity presumption model 32 and internal processing in the models 31 and 32 in case of evaluating the bed temperature control function. In this example, the engine speed and amount of fuel injection (amount of cylinder injection) are provided to the ECU-equivalent model 31 as a part of parameter group required for the bed temperature presumption. These parameters constitute a part of the input condition. Other parameters constituting the input condition are not shown in the drawing.

In the ECU-equivalent model 31, firstly, an exhaust temperature presumption unit 41 presumes an exhaust temperature corresponding to the given engine speed and amount of fuel injection with reference to an exhaust gas presumption map or the like. The presumed exhaust temperature is provided to a fuel addition unit 42. The fuel addition unit 42 seeks for a target bed temperature based on the given exhaust temperature and amount of fuel injection and calculates an amount of fuel addition to be provided from the fuel addition valve 8 as a manipulated variable for the fuel addition valve 8 to control the temperature of the catalyst 7 to be the target bed temperature. The calculated amount of fuel addition is provided to a bed temperature presumption unit 43. The bed temperature presumption unit 43 presumes a bed temperature corresponding to the given amount of fuel addition based on the predetermined bed temperature presumption logic. For the presumption of bed temperature, for example, an internal parameter such as the catalyst heat capacity is referred, however, it is not shown in the drawing. The bed temperature presumed by the bad temperature presumption unit 43 is output from the ECU-equivalent model 31 as the state quantity related to the engine 1. The bed temperature presumed by the bed temperature presumption unit 43 is fed back to the fuel addition unit 42. The fuel addition unit 42 studies the difference between the presumed bed temperature fed back thereto and the target bed temperature determined based on the exhaust temperature to make changes the control algorithm for determining the additive amount accordingly. As a result, the bed temperature presumed by the bed temperature presumption unit 43 is reflected to the control of catalyst bed temperature through the operation of the fuel addition valve 8.

As parameters required for the bed temperature presumption, the engine speed and amount of fuel injection are provided to the state quantity presumption model 32 as a part of the state quantity presumption condition. The engine speed is set to the same value as the value provided to the ECU-equivalent model 31. On the other hand, with respect to the amount of fuel injection, a value in which a predetermined error is added to the value provided to the ECU-equivalent model 31 is provided to the state quantity presumption model 32. In the state quantity presumption model 32, an exhaust temperature presumption unit 51 presumes an exhaust temperature corresponding to the given engine speed and the amount of fuel injection (here, the value including an error) with reference to an exhaust temperature presumption map or the like. The exhaust temperature presumed by the exhaust temperature presumption unit 51 is provided to a bed temperature presumption unit 52 as a part of a parameter group required for the bed temperature presumption. The amount of fuel addition calculated by the fuel addition unit 42 of the ECU-equivalent model 31 is further provided to the bed temperature presumption unit 52 as a part of a parameter group required for the bed temperature presumption. That is, the amount of fuel addition determined by the ECU-equivalent model 31 is provided to the state quantity presumption model 32 as a parameter constituting the state quantity presumption condition.

The bed temperature presumption unit 52 presumes a bed temperature corresponding to the given exhaust temperature and the amount of fuel addition, according to a predetermined bed temperature presumption logic. For the presumption of bed temperature, for example, an internal parameter such as catalyst heat capacity is referred, however, it is not shown in the drawings. The bed temperature presumed by the bed temperature presumption unit 52 is output from the state quantity presumption model 32 as the state quantity of the engine 1. The bed temperature presumed by the bed temperature presumption unit 52 is fed back to the ECU-equivalent model 31. In the ECU-equivalent model 31, a difference between the bed temperature provided from the state quantity presumption model 32 and the bed temperature presumed by the bed temperature presumption unit 43 of the ECU-equivalent model 31 is detected and the difference is fed back to the bed temperature presumption unit 43. The bed temperature presumption unit 43 studies the fed back difference of bed temperature and makes changes to the control algorithm (bed temperature presumption logic) for presumption of bed temperature.

According to the above processing, a bed temperature presumption value with no error in the amount of fuel injection is output from the ECU-equivalent model 31 and a bed temperature presumption value with an error in the amount of fuel injection is output from the state quantity presumption model 32. By comparing these bed temperatures, it is possible to evaluate whether or not the ECU-equivalent model 31 can detect an influence on the bed temperature control exerted by the deviation of recognition in the ECU 11 with respect to the amount of fuel injection, and therefore, the robustness (tenacity) of the bed temperature control function of the control system for the error of the fuel injection amount can be judged. When considering that the bed temperature presumed by the state quantity presumption model 32 is fed back to the ECU-equivalent model 31 to thereby revise the bed temperature presumption logic, in case where the bed temperature presumed by the state quantity presumption model 32 deviates to the higher side than the bed temperature presumed by the ECU-equivalent model 31, it means that the control algorithm of the ECU-equivalent model 31 is not detecting the influence of an error of the fuel injection amount, and accordingly, the robustness of the control system for the error of the fuel injection amount should be evaluated relatively in low level. Alternatively, the robustness should be evaluated relatively in low level if the frequency of differences generated in the bed temperature presumption value in a predetermined period of time is greater. Further, the robustness should be evaluated relatively in low level if the absolute value of the bed temperature presumed by the state quantity presumption model 32 is higher.

In FIG. 5, there is set an error in the amount of fuel injection, however, as shown with dashed lines in the drawing, an error related to the internal parameter of the exhaust temperature presumption unit 51 or the bed temperature presumption unit 52 of the state quantity presumption model 32, or an error in the amount of fuel addition provided to the state quantity presumption model 32 from the ECU-equivalent model 31 may be provided to evaluate the robustness of the control system for that error. Here, the presumption accuracy levels of the respective exhaust temperature presumption unit 51 and the bed temperature presumption unit 52 may be the same as or higher than those of the exhaust temperature presumption unit 41 and the bed temperature presumption unit 43 of the ECU-equivalent model 31. In FIG. 5, the amount of fuel injection is input from outside the ECU-equivalent model 31, however, the ECU-equivalent model 31 may calculate the amount of fuel injection based on the input condition and provide it to the exhaust temperature presumption units 41 and 51, respectively.

Figure 6:
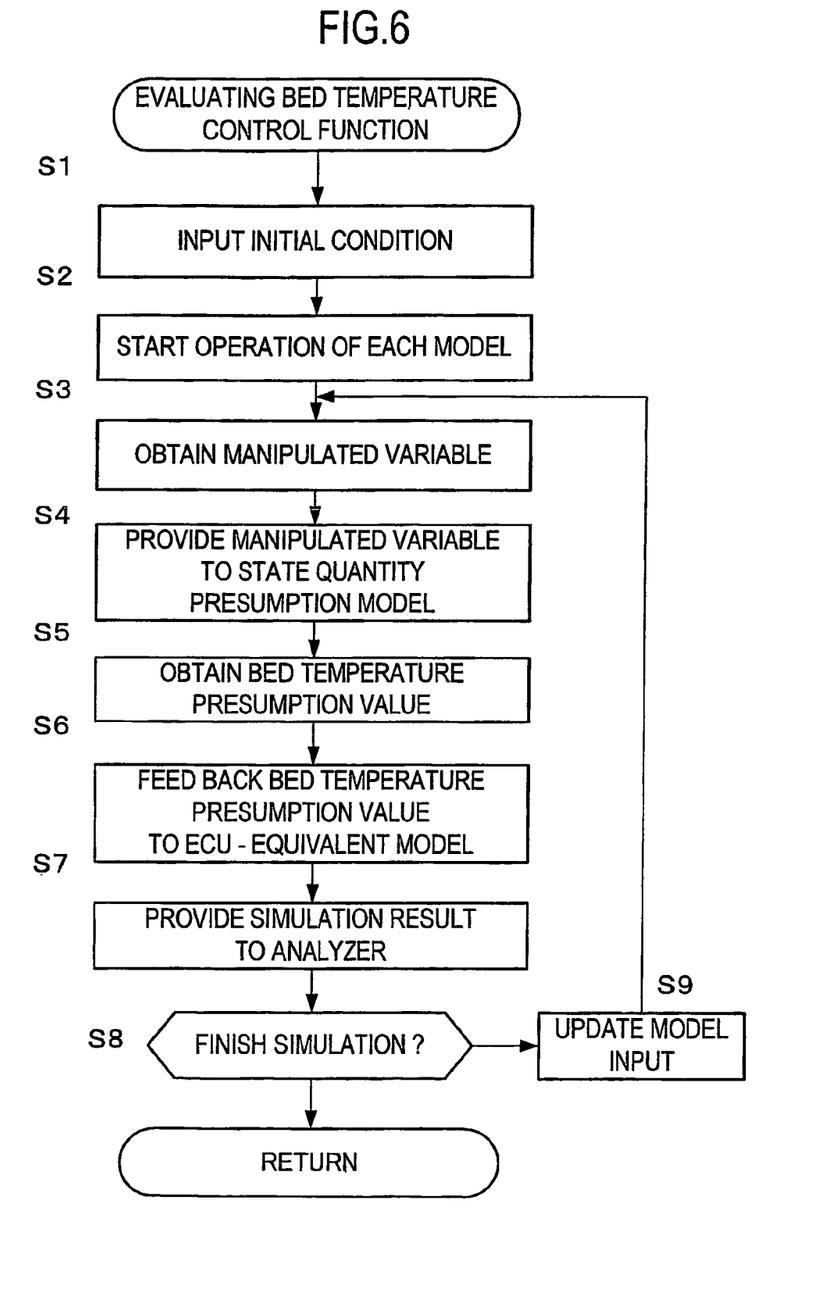
FIG. 6 is a flowchart showing a bed temperature control function evaluating routine implemented by a simulation controller to realize the processing shown in FIG. 5.

FIG. 6 is a flow chart showing a bed temperature control function evaluating routine executed by the simulation controller 33 in order to carry out the above processing related to the evaluation of the bed temperature control function. According to the routine shown in FIG. 6, the simulation controller 33 inputs initial condition to the ECU-equivalent model 31 and the state quantity presumption unit 32 in the first step S1 and makes the ECU-equivalent model 31 and the state quantity presumption model 32 operate according to the input condition in the following step S2. Here, the input condition shown in FIG. 3 is provided to the ECU-equivalent model 31 and the input condition and the error shown in FIG. 4 is provided to the state quantity presumption model 32. In the next step S3, the simulation controller 33 obtains the amount of fuel addition from the ECU-equivalent model 31 as a manipulated variable, and in the next step S4, the simulation controller 33 provides the manipulated variable to the status quantity presumption model 32. Here, when an error is added, the error may be added in step S4 in place of step S1.

In the next step S5, the simulation controller 33 obtains the bed temperature presumption values output from the respective models 31 and 32. In the following step S6, the simulation controller 33 feeds back the bed temperature presumption value output from the state quantity presumption model 32 to the ECU-equivalent model 31, and further in the step S7, the simulation controller 33 transfers the simulation results, in this case the bed temperature presumption values output from the respective models 31 and 32, to the analyzer 34. Further in step S8, it is determined whether or not the simulation is completed, that is, whether or not the simulation has already been continued for a predetermined period of time. If the simulation is not completed, the processing is forwarded to step S9 and the input condition to each model is updated by reflecting the manipulated variable of the ECU-equivalent model 31 and the state quantity of the state quantity presumption model 32 at that point of time, and then the processing goes back to step S3. If it is determined that the simulation is completed, the models are stopped and the routine is finished.

Figure 7:
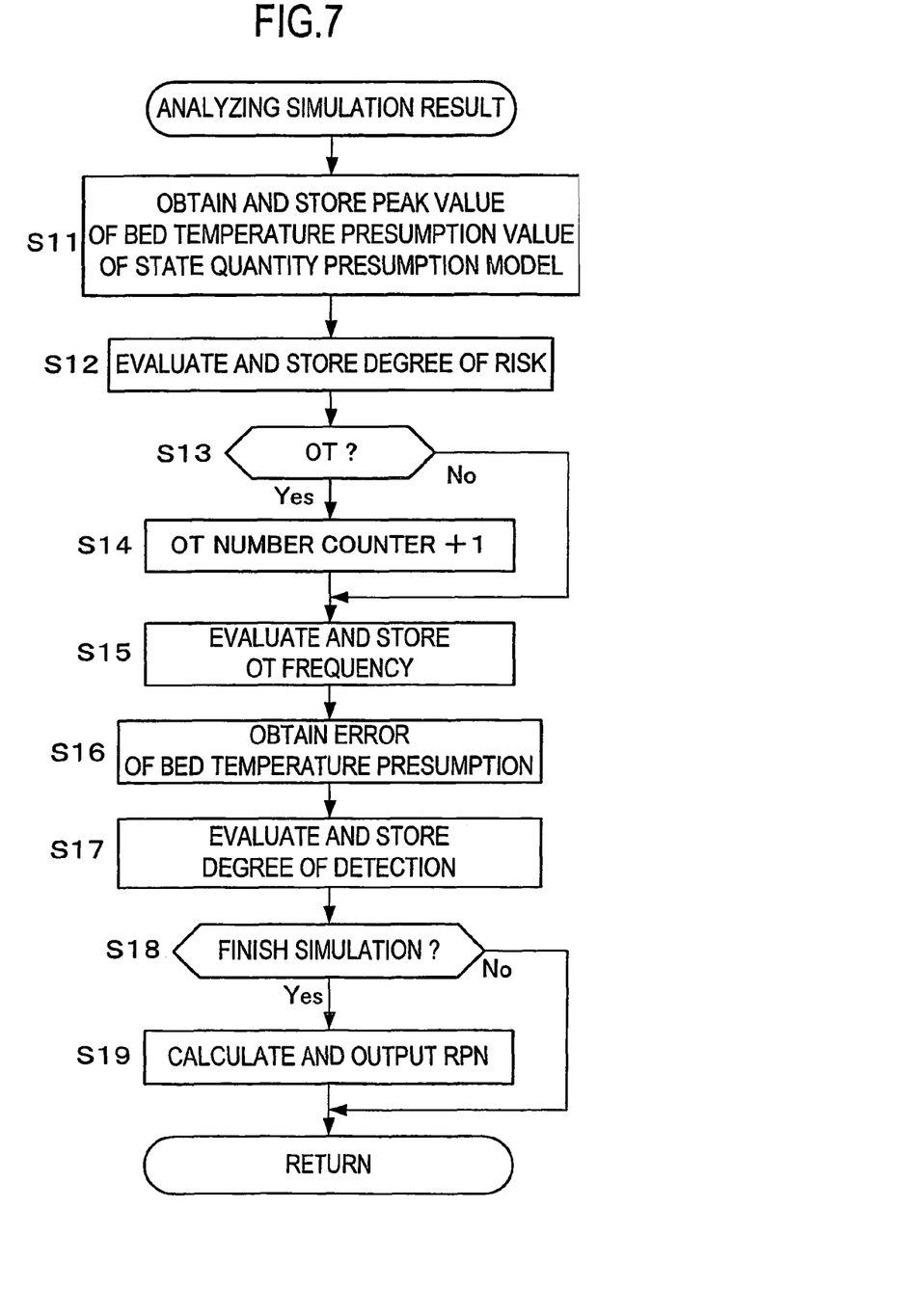
FIG. 7 is a flowchart showing a simulation result analyzing routine implemented by an analyzer in correspondence with the processing in FIG. 6.
Figure 8:
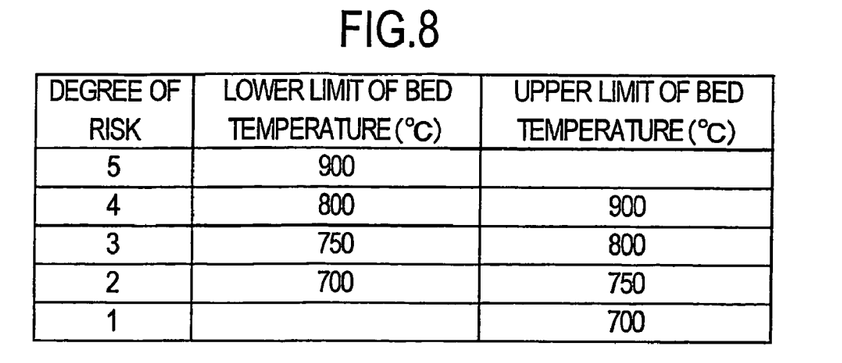
FIG. 8 is a diagram showing evaluating sections for quantitatively evaluating risk for bed temperature presumed by the state quantity presumption model.

FIG. 7 shows an example of a simulation result analyzing routine based on the FMEA method executed by the analyzer 34. This routine is repeatedly executed in a predetermined sampling period. The simulation result analyzer 34 monitors the bed temperature presumption values output from the state quantity presumption model 32, obtains the peak value thereof and stores it in the first step S11. The risk of the bed temperature peak value is evaluated and the evaluation result is stored in an internal memory of the calculation device 22 in the following step 12. As shown in FIG. 8, the bed temperature is classified into five levels of 1 to 5 according to the temperature regions and the degree of risk is quantitatively evaluated according to the temperature region to which the acquired bed temperature peak value belongs. For example, when the bed temperature peak value is 720° C., the degree of risk is evaluated as "2". Going back to the FIG. 7, in the following step S13, it is evaluated whether or not an over temperature (OT) condition, in which the bed temperature peak value obtained in step S11 exceeds the predetermined temperature set as a threshold temperature of the catalyst 7 (700° C., in this example), occurs. When it is determined that such over temperature condition occurs, "1" is added to an OT number counter assured in the internal memory of the calculation device 22. In a case where such over temperature condition does not occur, step S14 is skipped.

Figure 9:
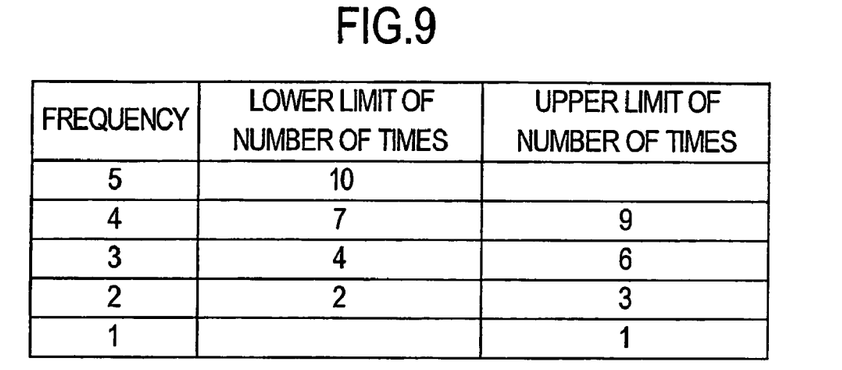
FIG. 9 is a diagram showing evaluating sections for quantitatively evaluating frequency that the bed temperature presumed by the state quantity presumption model exceeds an allowable region.
Figure 10:
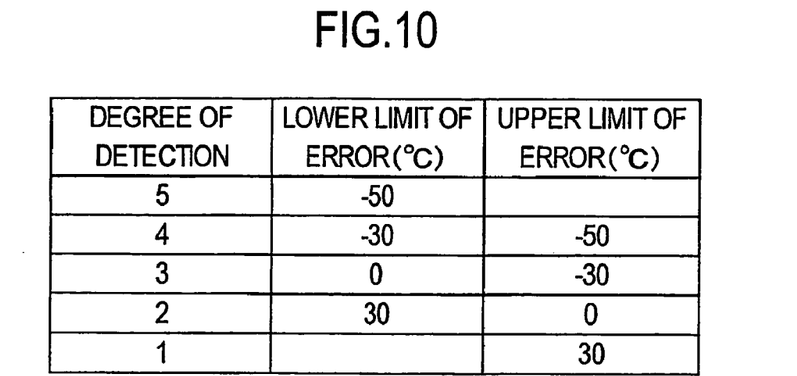
FIG. 10 is a diagram showing sections for quantitatively evaluating detection level of the ECU-equivalent model relating a difference between the bed temperature presumed by the ECU-equivalent model and the bed temperature presumed by the state quantity presumption model.

In the next step S15, an OT frequency is evaluated based on the value of the OT number counter and the evaluation result is stored. As shown in FIG. 9, the value (number) of the OT counter is classified into five levels of 1 to 5 and the OT frequency is quantitatively evaluated according to the region to which the current OT counter value belongs. For example, when the value of the OT number counter is "5", its OT frequency is evaluated as "3". Going back to FIG. 7, in the following step 16, a difference between the bed temperature presumption values output from the respective models 31 and 32 is obtained as a bed temperature presumption error. Here, a value of taking the bed temperature presumption value of the state quantity presumption model 32 from the bed temperature presumption value of the ECU-equivalent model 31 is used as the bed temperature presumption error. In the following step S17, the degree of detection of the bed temperature presumption error is evaluated and the evaluation result is stored in the internal memory of the calculation device 22. The bed temperature presumption error is, as shown in FIG. 10, classified into five levels of 1 to 5 according to the temperature regions and the degree of detection is quantitatively evaluated based on the region to which the error obtained in step S16 belongs. For example, the bed temperature presumption error is −28° C., the degree of detection is evaluated as "3".

Going back to FIG. 17, in the following step S18, it is determined whether or not the simulation is completed, and if the simulation is not completed, the routine for this time is finished. If it is determined that the simulation is completed, the processing is forwarded to step S19 and an RPN (Risk Priority Number) is calculated by multiplying the values of the degree of risk obtained in step S12, the frequency obtained in step S14, and the degree of detection obtained in step S17, and the calculated result is output to the simulation controller 33. The routine is finished with this RPN calculation.

Figure 11:
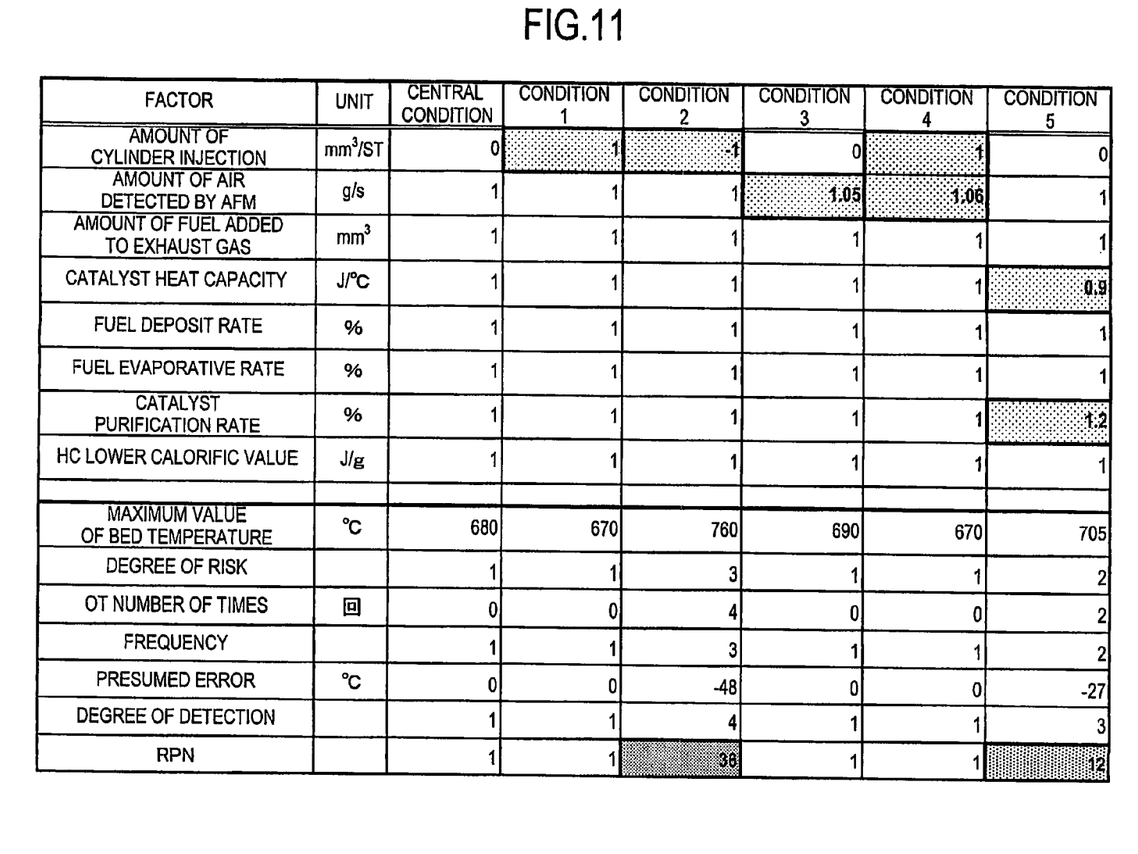
FIG. 11 is a diagram showing a display example of an analyzing result by an analyzer.

The simulation controller 33 outputs the degree of risk calculated by the analyzer 34, the CT frequency, the degree of detection, the RPN in a predetermined format to the monitor 25 or the like. FIG. 11 shows an example of displaying the simulation results. In this example, the case where any error is given to the state quantity presumption model 32 is set as a central condition, simulations are carried out according to Conditions 1 to 5 with different combinations of errors and the bed temperature peak value (bed temperature MAX), degree of risk, OT number, frequency, presumption error, degree of detection, and RPN are displayed corresponding to the respective conditions. Here, in Condition 1 and Condition 2, errors of "1 mm$^3$/ST (one stroke)", "−1 mm$^3$/ST" are given to the amount of fuel cylinder injection, respectively in the order. In Condition 3, an error of "+5%" is given to the detection value of the amount of intake air. In Condition 4, an error of "1 mm$^3$/ST" is given to the amount of fuel cylinder injection and an error of "+6%" is given to the detection value of the amount of intake air. In Condition 5, an error of "−10%" is given to the amount of catalyst heat capacity and an error of "+20%" is given to the catalyst purification rate. The items provided with errors may be displayed in different way with different color, blinking, or the like. Further, the RPN is shown "36" in Condition 2 and "12" in Condition 5 and it is found that the robustness of the control system is low in these conditions. These RPNs with low robustness may be displayed in different way. For example, conditions having RPN which is beyond an allowable range may be abstracted by the simulation controller 33 and those conditions may be highlighted.

With the above analyzing processing, the influence on the bed temperature control of the ECU-equivalent model 31 exerted by the error in the amount of fuel injection may be quantified with three point of views of the absolute value of bed temperature, the frequency of over temperature, and the error of presuming bed temperature, and the robustness against the error of the amount of fuel injection in the control system expressed by the ECU-equivalent model 31 can be objectively evaluated. It can be found, from the simulation results, that the bed temperature control function of the control system needs to be reexamined for the conditions having low robustness. In the example shown in FIG. 11, it is found, with the simulation result in Condition 2, that the control function needs to be improved for the case where a lower amount of fuel cylinder injection appears. In this case, the control accuracy for the amount of fuel cylinder injection is required to be reexamined. To improve the control accuracy for the amount of fuel cylinder injection, for example, measures such as to improve accuracy of algorithm related to the control of the amount of fuel cylinder injection, to reexamine the tolerance in manufacturing hardware such as a pressure regulator for controlling the fuel injection valve 5 or the fuel injection pressure, or to add a detection unit for detecting the error of the amount of fuel cylinder injection and a feedback control for controlling according to the detection results, can be considered. In the condition 5, measures such as to reexamine the tolerance in manufacturing the catalyst 7, to improve quality of the catalyst 7 or the like is considered.

In FIGS. 5 to 11, the evaluation of robustness regarding the bed temperature control of the catalyst 7 is described as an example. However, according to the above embodiment, various control function in the control system of the engine 1 can be evaluated by outputting manipulated variables of the ECU 11 related to the various equipments to be controlled by the ECU 11 from the ECU-equipment model 31 and providing the manipulated variables and various errors having influences on the state quantity to the state quantity presumption model 32 to presume the state quantities reflecting the errors of the engine 1.

It is noted that the present invention is not limited to the above embodiment and can be carried out in various conformations. For example, in the above embodiment, the state quantity such as the bed temperature is also presumed in the ECU-equivalent model 31 and the presumed value is compared with the value presumed by the state quantity estimation model 32 to evaluate the robustness, however, the present invention can be applied even in the case where the ECU-equivalent model does not have a function for presuming state quantity, as long as a relationship in which the ECU-equivalent model outputs manipulated variables and the state quantity presumption model presumes state quantity corresponding to the manipulated variable from the ECU-equipment model. For example, when the bed temperature control function is evaluated, the frequency of over temperature and the amount of excess of the bed temperature from the allowable region or the like may be obtained based on the bed temperature output from the state quantity presumption model to thereby evaluate the suitability of the bed temperature control function. Even when the ECU-equivalent model is a model of so called open-loop controlling type which does not have a feedback control function of state quantity of bed temperature or the like, it is able to obtain the frequency of over temperature and amount of excess of the temperature from the allowable region based on the state quantity presumed by the state quantity presumption model, in the same way of the above, and to determine the need for adding feedback controls based on the result. Analysis of the simulation result should not be limited to the FMEA method and various methods may be employed.

In the above embodiment, an example of a control system in an automobile engine is described, however, the present invention may be applied for evaluation of control systems in various physical devices without limitation to an engine. For example, the present invention may be applied to control system for ABS, chassis control, attitude control or the like for automobiles. Further, the physical device is not limited to a device employed in an automobile and the present invention may be used in various devices for airplanes, ships, robots, machine tools, plant facilities, power generation plants or the like.

The invention claimed is:

1. An evaluation device for a control system of a physical device, comprising:
   an evaluation target model which operates according to a control algorithm to be implemented in the control system, and which outputs a manipulated variable of a predetermined controlled equipment included in the physical device in correspondence with a predetermined input condition;
   a state quantity presumption model which presumes a state quantity of the physical device subjected to an influence of an operation of the controlled equipment in correspondence with a predetermined state quantity presumption condition, and which outputs the presumed state quantity; and
   a model control device which provides the input condition to the evaluation target model so that the manipulated variable is output therefrom and which provides, as the state quantity presumption condition, an error regarding at least one parameter to be referred in a presumption of the state quantity, in addition to the input condition provided to the evaluation target model and the manipulated variable output from the evaluation target model, to the state quantity presumption model so that a state quantity reflecting an influence of the error on a state quantity corresponding to the manipulated variable output from the evaluation target model is output from the state quantity presumption model.

2. The evaluation device according to claim 1, wherein the model control device provides the error for a parameter included in the input condition or the manipulated variable output from the evaluation target model.

3. The evaluation device according to claim 1, wherein the evaluation target model presumes a state quantity to be controlled by an operation of the controlled equipment and reflects a presumption result to control of the state quantity, and the state quantity presumption model presumes and outputs a state quantity which is the same kind of the state quantity presumed by the evaluation target model.

4. The evaluation device according to claim 3, wherein the evaluation target model reflects a difference between the state quantity presumed by the evaluation target model and the state quantity presumed by the state quantity presumption model to a presumption of the state quantity in the evaluation target model.

5. The evaluation device according to claim 1, further comprising an analyzing device which quantifies an influence of the error on control of the state quantity of the evaluation target model based on at least one of degree or frequency for the case where the state quantity output from the state quantity presumption model exceeds an allowable region.

6. The evaluation device according to claim 3, further comprising an analyzing device which quantifies an influence of the error on control of the state quantity of the evaluation target model based on a difference of state quantities presumed in the evaluation target model and the state quantity presumption model respectively.

7. The evaluation device according to claim 6, wherein the analyzing device quantifies the influence of the error on the control of the state quantity by the evaluation target model, further taking at least one of degree or frequency for a case where the state quantity output from the state quantity presumption model exceeds a predetermined allowable region into account.

8. The evaluation device according to claim 5, further comprising an analyzing result displaying device which displays an analyzing result quantified by the analyzing device on a predetermined display device.

9. The evaluation device according to claim 8, wherein the analyzing result displaying device performs a predetermined highlighting display when the analyzing result exceeds a predetermined allowable region.

10. The evaluation device according to claim 1, wherein the physical device is an automobile engine, the control algorithm is implementable to an engine control unit as a computer to be combined with the engine, the input condition includes a parameter group for determining an operation condition or an environment condition of the engine, and the controlled equipment is an equipment of the engine, which is operated for controlling the engine.

11. A validation device for evaluating a control system of a physical device in combination with an evaluation target model which operates according to a control algorithm to be implemented in the control system, and which outputs a manipulated variable of a predetermined controlled equipment included in the physical device in correspondence with a predetermined input condition, comprising:
    a state quantity presumption model which presumes a state quantity of the physical device subjected to an influence of an operation of the controlled equipment in correspondence with a predetermined state quantity presumption condition, and which outputs the presumed state quantity; and
    a model control device which provides the input condition to the evaluation target model so that the manipulated variable is output therefrom and which provides, as the state quantity presumption condition, an error regarding at least one parameter to be referred in a presumption of the state quantity, in addition to the input condition provided to the evaluation target model and the manipulated variable output from the evaluation target model, to the state quantity presumption model so that a state quantity reflecting an influence of the error on a state quantity corresponding to the manipulated variable output from the evaluation target model is output from the state quantity presumption model.

12. A computer readable medium that stores a computer program configured to make a computer serve as:
    an evaluation target model which operates according to a control algorithm to be implemented in the control system, and which outputs a manipulated variable of a predetermined controlled equipment included in the physical device in correspondence with a predetermined input condition;
    a state quantity presumption model which presumes a state quantity of the physical device subjected to an influence of an operation of the controlled equipment in correspondence with a predetermined state quantity presumption condition, and which outputs the presumed state quantity; and
    a model control device which provides the input condition to the evaluation target model so that the manipulated variable is output therefrom and which provides, as the state quantity presumption condition, an error regarding at least one parameter to be referred in a presumption of the state quantity, in addition to the input condition provided to the evaluation target model and the manipulated variable output from the evaluation target model, to the state quantity presumption model so that a state quantity reflecting an influence of the error on a state quantity corresponding to the manipulated variable output from the evaluation target model is output from the state quantity presumption model.

13. A computer readable medium that stores a computer program for making a computer serve as an element of an evaluation device having an evaluation target model which operates according to a control algorithm to be implemented in a control system of a physical device, and which outputs a manipulated variable of a predetermined controlled equipment included in the physical device in correspondence with a predetermined input condition, the computer program being configured to make the computer serve as:

a state quantity presumption model which presumes a state quantity of the physical device subjected to an influence of an operation of the controlled equipment in correspondence with a predetermined state quantity presumption condition, and which outputs the presumed state quantity; and     a model control device which provides the input condition to the evaluation target model so that the manipulated variable is output therefrom and which provides, as the state quantity presumption condition, an error regarding at least one parameter to be referred in a presumption of the state quantity, in addition to the input condition provided to the evaluation target model and the manipulated variable output from the evaluation target model, to the state quantity presumption model so that a state quantity reflecting an influence of the error on a state quantity corresponding to the manipulated variable output from the evaluation target model is output from the state quantity presumption model.

\* \* \* \* \*